US008221227B2

(12) United States Patent
Koyama

(10) Patent No.: US 8,221,227 B2
(45) Date of Patent: Jul. 17, 2012

(54) BETTING APPARATUS FOR GAME

(75) Inventor: Toshimi Koyama, Koto (JP)

(73) Assignee: Universal Entertainment Corporation, Tokyo (JP)

( * ) Notice: Subject to any disclaimer, the term of this patent is extended or adjusted under 35 U.S.C. 154(b) by 690 days.

(21) Appl. No.: 12/389,742

(22) Filed: Feb. 20, 2009

(65) Prior Publication Data

US 2009/0233698 A1 Sep. 17, 2009

(30) Foreign Application Priority Data

Mar. 12, 2008 (JP) ................................ 2008-061987

(51) Int. Cl.
*A63F 9/24* (2006.01)
*A63F 13/00* (2006.01)

(52) U.S. Cl. ......... 463/25; 463/29; 343/893; 340/13.26; 340/13.27; 340/13.28

(58) Field of Classification Search .................... 463/25, 463/29; 340/13.26, 13.27, 13.28; 343/893
See application file for complete search history.

(56) References Cited

U.S. PATENT DOCUMENTS

| | | | | |
|---|---|---|---|---|
| 5,735,742 | A * | 4/1998 | French | 463/25 |
| 6,392,544 | B1 * | 5/2002 | Collins et al. | 340/572.7 |
| 7,561,053 | B2 * | 7/2009 | Hecht et al. | 340/572.7 |
| 7,701,344 | B2 * | 4/2010 | Mattice et al. | 340/572.1 |
| 7,792,559 | B2 * | 9/2010 | Viorel et al. | 455/575.7 |
| 2002/0117543 | A1 * | 8/2002 | Kocznar et al. | 235/380 |
| 2009/0085752 | A1 | 4/2009 | Koyama et al. | |

FOREIGN PATENT DOCUMENTS

| | | |
|---|---|---|
| JP | 2004-102953 | 4/2004 |
| JP | 2004-105321 | 4/2004 |

* cited by examiner

*Primary Examiner* — Steven J Hylinski
(74) *Attorney, Agent, or Firm* — Oblon, Spivak, McClelland, Maier & Neustadt, L.L.P.

(57) ABSTRACT

A betting apparatus for game includes a betting board, antennas and a control unit. The antennas are arranged to regions on the betting board and detect a gaming chip placed on the betting board. The control unit turns on or off an electric current to each of the antennas. When the control unit turns on an electric current to one antenna arranged to one region, the control unit shorts another antenna arranged to another region adjacent to the one region.

4 Claims, 12 Drawing Sheets

BETTING APPARATUS FOR GAME

CROSS REFERENCE TO RELATED APPLICATION

This application claims benefit of priority under 35 U.S.C. §119 to Japanese Patent Application No. 2008-061987, filed on Mar. 12, 2008, the entire contents of which are incorporated by reference herein.

BACKGROUND OF THE INVENTION

1. Field of the Invention

The present invention relates to a betting apparatus for game configured to allow one or more players to bet one or more gaming chips in a game such as roulette.

2. Description of the Related Art

Patent documents 1 (Japanese Published Unexamined Application No. 2004-105321) and 2 (Japanese Published Unexamined Application No. 2004-102953) disclose a betting apparatus for game configured to arrange X-array antennas for emitting radio waves along an X-direction (e.g., lateral direction) of betting board and Y-array antennas for emitting radio waves along a Y-direction (e.g., longitudinal direction) of betting board under the betting board, so as to read information stored in a wireless IC tag embedded in a gaming chip placed on the betting board. When an X-array antenna and a Y-array antenna emit radio waves, a magnetic field is generated in an upward direction vertical to the betting board at the cross point where the X-array antenna crosses the Y-array antenna. The betting apparatus reads information stored in a wireless IC tag embedded in a gaming chip placed on each cross point using a magnetic field, in series.

A betting board of a table game such as roulette used in a casino has a frame on an upper surface thereof. The upper surface is divided into betting regions by the frame. A player places one or more gaming chips on one or more betting regions to bet the one or more gaming chips. Then, a betting apparatus for game reads information stored in a wireless IC tag embedded in a gaming chip placed on each betting region.

As shown in FIG. 1, an upper surface 101 of a betting board is divided into betting regions 103 by a frame 102. It is noted that FIG. 1 illustrates a part of the betting regions 103.

In order to read information stored in a wireless IC tag embedded in a gaming chip placed on a betting region 103, as shown in FIG. 2, antennas (loop antennas) 104 are arranged in the betting board. Each antenna 104 is arranged to each betting region 103 and is arranged along the frame 102 which divides adjacent betting regions 103. Antennas 104 (A1 to A6) shown in FIG. 2 are arranged to betting regions 103 shown in FIG. 1, respectively.

FIG. 3 illustrates the arrangement relation between gaming chips 105 placed on the upper surface 101 and the antennas 104 (A1 to A6). Plural pieces of information stored in wireless IC tags embedded in the gaming chips 105 are read by corresponding antennas 104 (A1, A5 and A6). Namely, when the corresponding antennas 104 generate magnetic fields in the upward direction vertical to the betting board, the wireless IC tags embedded in the gaming chips 105 are electrified and then transmit the plural pieces of information. The plural pieces of information transmitted are read by the corresponding antennas 104 or antennas other than the corresponding antennas 104. Even if plural gaming chips 105 are stacked on the upper surface 101 in layers, a single antenna 104 can read plural pieces of information stored in wireless IC tags embedded in the plural gaming chips 105 stacked. A betting apparatus for game switches the corresponding antennas 104 in series, to carry out the reading operation with respect to the wireless IC tags embedded in the gaming chips 105. Thereby, the betting apparatus can read the plural pieces of information stored in the wireless IC tags embedded in all gaming chips 105 placed on the betting board.

Magnetic lines of magnetic field generated by an antenna 104 are formed in concentric loops. So, if the magnitude of magnetic force is too large, an antenna 104 is likely to read another information stored in a wireless IC tag embedded in another gaming chip 105 placed on another betting region 103 adjacent to a betting region 103 corresponding to the antenna 104, due to magnetic field generated by the antenna 104.

For example, as shown in FIG. 3, when the antenna 104 (A5) reads information stored in the wireless IC tag embedded in the gaming chip 105 placed on the betting region 103 corresponding to the antenna 104 (A5), the antenna 104 (A5) is likely to read another information stored in the wireless IC tag embedded in another gaming chip 105 placed on another betting region 103 corresponding to the antenna 104 (A6) adjacent to the betting region 103 corresponding to the antenna 104 (A5).

SUMMARY OF THE INVENTION

It is an object of the present invention to provide a betting apparatus for game capable of surely preventing an antenna from reading another information stored in a wireless IC tag embedded in another gaming chip placed on another betting region adjacent to a betting region corresponding to the antenna.

In order to achieve the object, the present invention provides a betting apparatus for game comprising: a betting board; antennas that are arranged to regions on the betting board and detect a gaming chip placed on the betting board; and a control unit that turns on or off an electric current to each of the antennas, wherein, when the control unit turns on an electric current to one antenna arranged to one region, the control unit shorts another antenna arranged to another region adjacent to the one region.

According to the present invention, when the betting apparatus reads information stored in a gaming chip placed on a region using an antenna arranged to the region, the control unit shorts another antenna arranged to another region adjacent to the region. Therefore, even if a magnetic field generated by the antenna arranged to the region affects another antenna arranged to another region adjacent to the region, the another antenna generates an induced magnetic field so as to cancel the magnetic field affecting the another antenna. This surely prevents the betting apparatus from reading information stored in another gaming chip placed on another region adjacent to the region where an objective gaming chip is placed.

In a preferred embodiment of the present invention, when the control unit turns on an electric current to one antenna arranged to one region, the control unit shorts another antenna arranged to another region adjacent to the one region before starting turning on the electric current, and when the control unit turns off an electric current to one antenna arranged to one region, the control unit releases the short of another antenna arranged to another region adjacent to the one region after stopping turning off the electric current.

According to the embodiment, comparing the case where the control unit simultaneously turns on an electric current to one antenna to one region and shorts another antenna arranged to another region adjacent to the one region, and simultaneously turns off an electric current to one antenna arranged to one region and releases the short of another antenna arranged to another region adjacent to the one region, the embodiment surely prevents the betting apparatus from reading information stored in another gaming chip placed on another region adjacent to one region where one gaming chip is placed.

In a preferred embodiment of the present invention, the control unit simultaneously turns on electric currents to at least two antennas arranged to at least two regions between which at least two regions are located.

According to the embodiment, comparing the case where the betting apparatus reads plural pieces of information stored in gaming chips on regions by one region, the betting apparatus can reduce the reading time.

In a preferred embodiment of the present invention, the betting apparatus for game further comprises a switching unit that shorts each of the antennas and releases the short of each of the antennas, wherein, when the control unit turns on an electric current to one antenna arranged to one region, the control unit shorts another antenna arranged to another region adjacent to the one region using the switching unit.

According to the embodiment, the betting apparatus can effectively switch between the short of antenna and the release of short using the switching unit, which allows the betting apparatus to rapidly complete the reading action.

DESCRIPTION OF THE EMBODIMENTS

With reference to FIGS. 4 to 15, an exemplary embodiment of the present invention will be described below.

Figure 1:
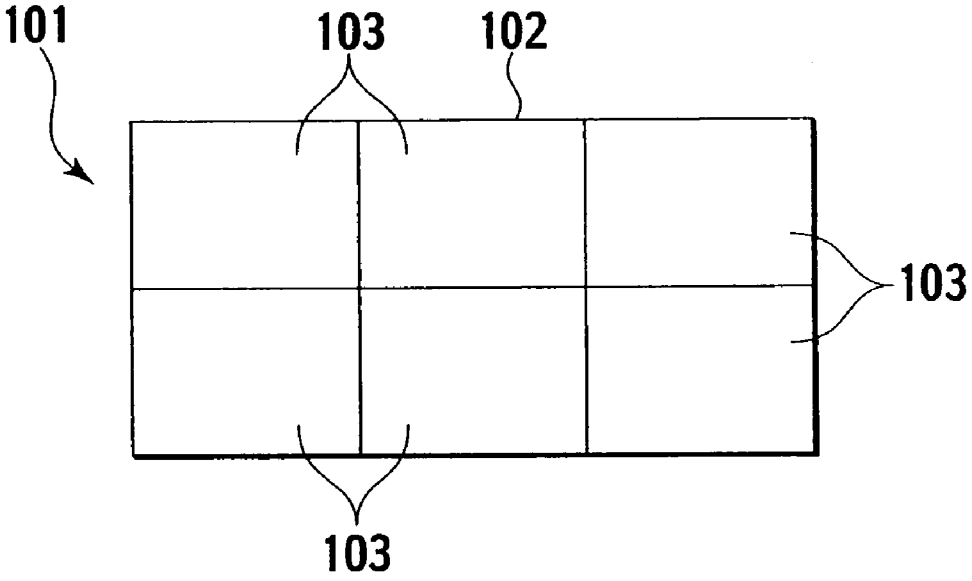
FIG. 1 is a plane view of a part of a betting board of a conventional betting apparatus for game.
Figure 2:
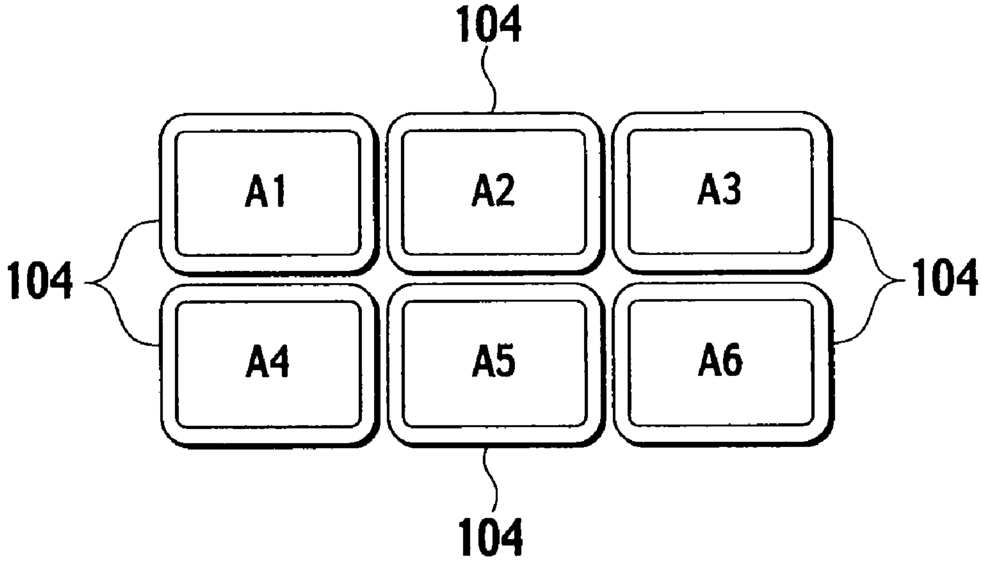
FIG. 2 is a plane view of antennas arranged in the betting board shown in FIG. 1.
Figure 3:
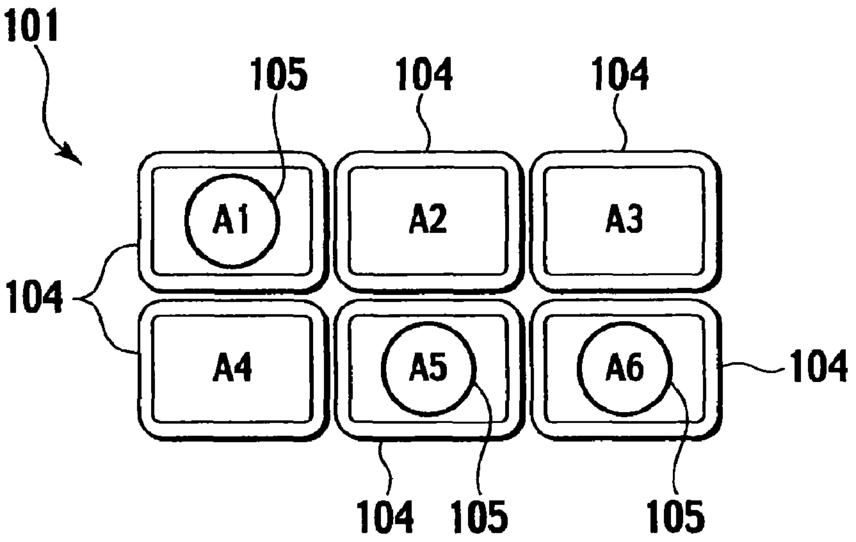
FIG. 3 is an explanatory diagram of the arrangement relation between gaming chips placed on the betting board shown in FIG. 1 and the antennas shown in FIG. 2
Figure 4:
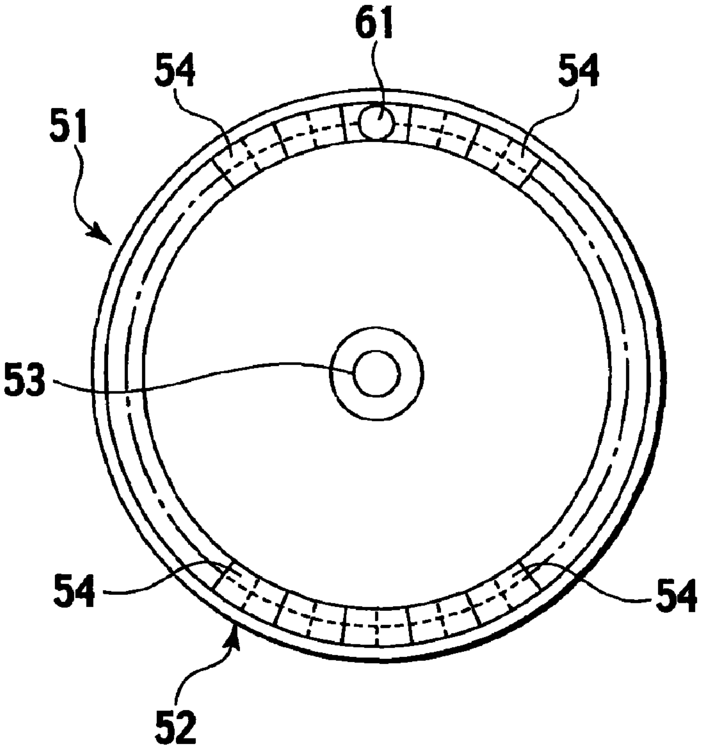
FIG. 4 is a plane view of a roulette board according to an exemplary embodiment of the present invention.
Figure 5:
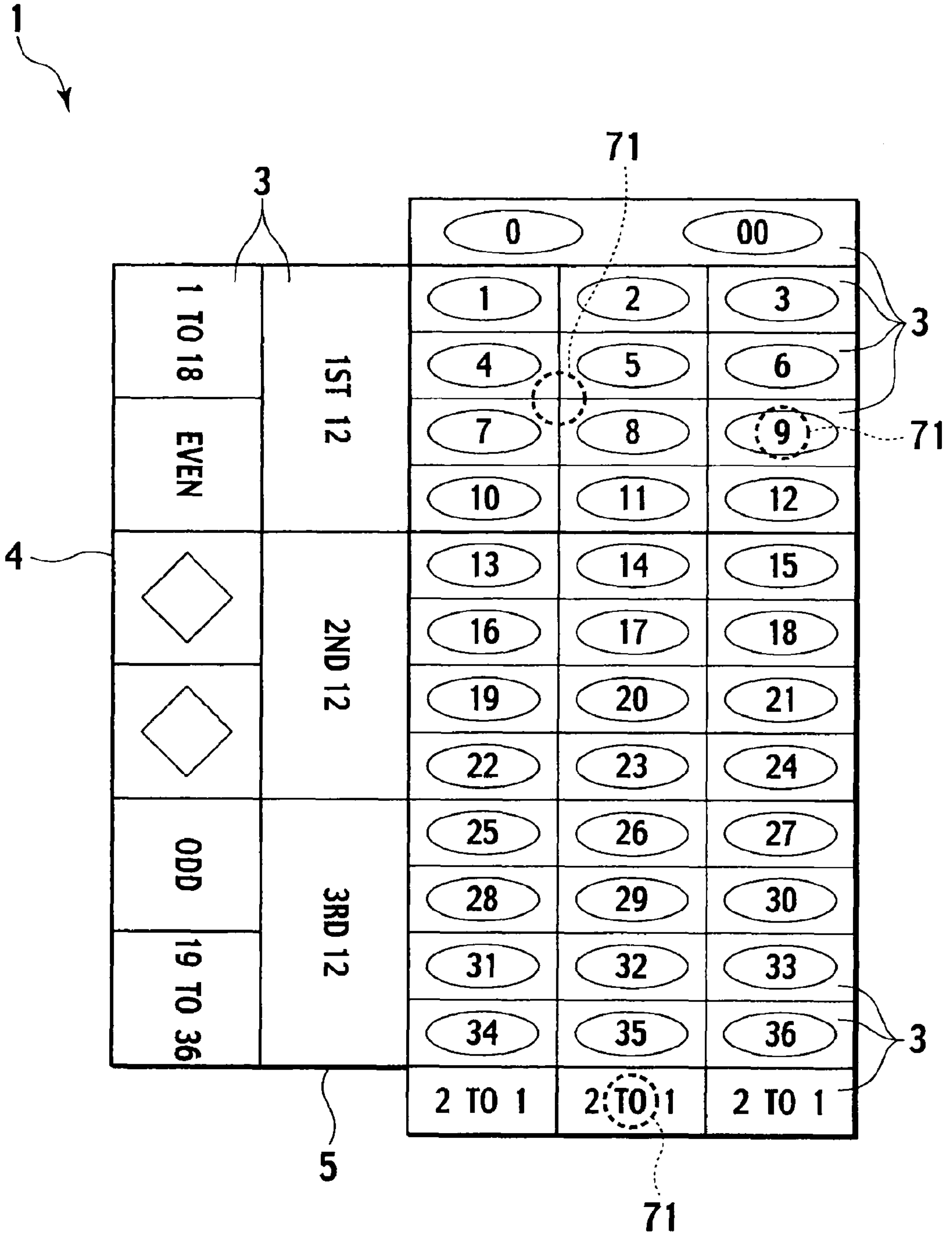
FIG. 5 is a plane view of a betting board of a betting apparatus for game according to the exemplary embodiment of the present invention.

A roulette board 51 shown in FIG. 4 and a betting apparatus for game 1 shown in FIG. 5 are installed in a casino within a casino hotel. A player predicts one or more pocket numbers assigned to one or more pockets 54 each in which he/she expects a roulette ball 61 thrown in the roulette board 51 to be received. Then, the player bets one or more gaming chips 71 on one or more betting regions 3 corresponding to the predicted one or more pocket numbers using the betting apparatus 1, and then plays the roulette.

Figure 6:
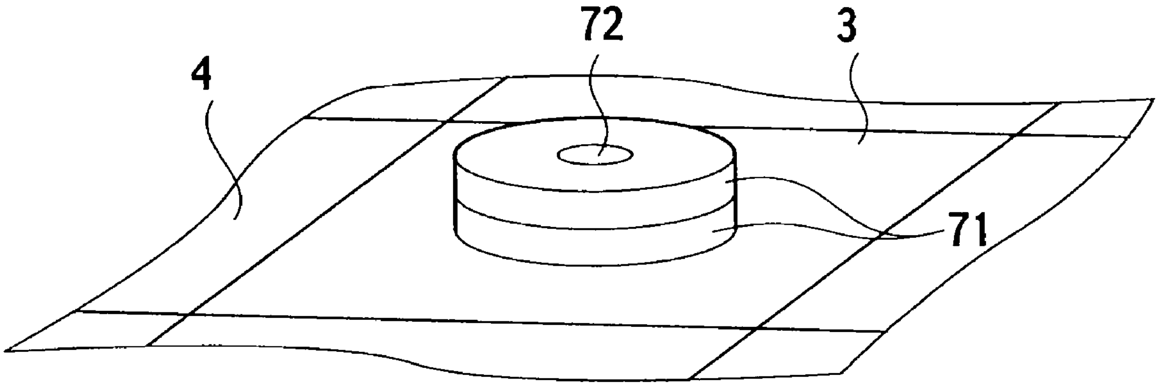
FIG. 6 is a partly enlarged perspective view of gaming chips stacked in layers on the betting board shown in FIG. 5.

The betting apparatus 1 is provided with a betting board 4 on which one or more gaming chips 71 will be bet. An upper surface of the betting board 4 is divided into betting regions 3 (e.g., spots where numbers "0", "00", "1", "2", . . . , "35", "36" are assigned) corresponding to pocket numbers assigned to pockets 54 of the roulette board 51. A frame 5 divides the upper surface of the betting board 4 into the betting regions 3. As shown in FIG. 6, a wireless IC tag 72 is embedded in a gaming chip 71 concerned and stores information regarding the gaming chip 71 therein. The roulette board 51 is provided with a pocket number detecting device 52 that detects a pocket number assigned to a pocket 54 in which the roulette ball 61 is received and a type of the pocket number (see FIG. 5). The betting board 4 is provided with a betting information detecting device 11 that detects a betting position and value of a gaming chip 71 by communicating with a wireless IC tag 72 embedded in the gaming chip 71 to read information regarding the gaming chip 71 stored in the wireless IC tag 72 when the gaming chip 71 is placed on a betting region 3 (see FIG. 7). Further, a dividend calculation system (not shown) is installed in the casino. The dividend calculation system calculates the dividend in a current game (roulette) on the basis of a pocket number assigned to a pocket 54 in which the roulette ball 61 is received, and a betting position and value of a gaming chip 71 placed on a betting region 3 corresponding the pocket number.

Information regarding a gaming chip 71 stored in a wireless IC tag 72 includes a unique number (identification number) for identifying the gaming chip 71, value (e.g., one-dollar, five-dollar or ten-dollar) of the gaming chip 71, color of the gaming chip 71, a place where the gaming chip 71 is allowed to be used (information for identifying a casino where the gaming chip 71 is allowed to be used). It is noted that, under a condition where the information includes only the unique number of the gaming chip 71 and other data are associated with the unique number and stored in a server within a casino as the database, the betting information detecting device 11 may detect other data on the basis of the unique number read from the wireless IC tag 72 while referring to the database stored in the server.

The pocket number detecting device 52 is an ID reading device (not shown). The ID reading device includes plural sets of X-side transmitting antennas and X-side receiving antennas that extend from an X-side scan driver in parallel with each other, and plural sets of Y-side transmitting antennas and Y-side receiving antennas that extend from a Y-side scan driver in parallel with each other. When scan radio waves are emitted from an X-side transmitting antenna and a Y-side transmitting antenna, a radio wave for reading is generated in an upward direction vertical to the roulette board 51 at the cross point where the X-side transmitting antenna cross the Y-side transmitting antenna. The radio wave for reading is received by a corresponding X-side receiving antenna and a corresponding Y-side receiving antenna. If the roulette ball 61 exists in the vicinity of the cross point, a receiving state is changed by impedance change according to dielectric effect of the roulette ball 61. The ID reading device determines whether or not there is the roulette ball 61 by detecting the change state.

More specifically, the roulette board 51 is formed in a circular rotating body shape. Thirty-eight pockets 54 are concentrically formed around a center axis 53. It is noted that FIG. 4 illustrates a part of the thirty-eight pockets 54. Each pocket 54 shows a number (e.g., 0, 00, 1, 2 . . . 35 or 36) assigned to each betting region 3 of the betting board 4. Cross points of the ID reading device are arranged to the thirty-eight pockets 54, respectively. When the roulette ball 54 is received in one pocket 54, the roulette ball 61 is located on any one of the cross points. If the roulette ball 61 is located on one cross point, a receiving state of only the one pocket 54 is changed because radio waves for reading are always generated in the upward direction at all the cross points in a game. This allows the ID reading device to determine the one pocket 54 where the roulette ball 61 is received. The ID reading device transmits data regarding the one pocket 54 to a player tracking system (PTS) server (not shown). The PTS server centrally manages the history of roulette.

The roulette ball 61 includes a wireless IC tag (not shown) in which roulette ball identification information for identifying the roulette ball 61 is stored. The wireless IC tag is embedded in the roulette ball 61. The roulette ball identification information includes a place of origin where the roulette ball 61 is stored (information for identifying a storage where the roulette ball 61 is allowed to be stored), a place where the roulette ball 61 is allowed to be used (information for identifying a casino where the roulette ball 61 is allowed to be used) and a type of the roulette ball 61. The ID reading device reads the roulette ball identification information stored in the wireless IC tag embedded in the roulette ball 61. This allows the ID reading device to determine whether or not a roulette ball can be used in this casino, which prevents fraudulent activity or infringement for using a counterfeit roulette ball in this casino from occurring.

In such a gaming system, a player who desires to play a game on the roulette board 51 carries an identification card and enters the casino. The identification card is issued from a card issuing device at a hotel front of casino hotel, with respect to a guest who checks in at the hotel front. The identification card is a card for identifying the guest. After the identification card is issued, when the guest produces his/her identification card and goes through a check at each facility of the casino hotel, he/she can use the facility. For example, at a cash desk of restaurant or bar in the casino hotel, when the identification card is read by a card reader, the amount of payment is associated with identification information of the guest and stored in a hotel server of the casino hotel. Then, at the time when he/she checks out at the hotel front, the total amount of payment is displayed on a terminal of the hotel front. Namely, the identification card has a function as credit card to be used when the guest makes payment in each facility of the casino hotel.

When the guest carries the identification card and enters the casino, he/she gets a desired number of gaming chips 71 from a gaming chip exchanging device and sets his/her identification card in a reading device (not shown) for reading identification card. At this time, the reading device reads information stored in the identification card to identify the guest and recognize him/her as a player who will participate in a game. The reading device transmits recognized data to the PTS server. The PTS server registers the recognized data as a player who will participate in a game. It is noted that a reading type of the identification card (e.g., magnetic reading type or optical reading type) may be arbitrarily set according to a recording type of the identification card (e.g., magnetic recording or optical recording).

In roulette, firstly, each player places one or more own gaming chips 71 on one or more desired betting regions 3 of the betting board 4 to bet the one or more gaming chips 71. For example, as shown in FIG. 5, a player places a gaming chip 71 on a corner of the numbers “4”, “5”, “7” and “8” to carry out a corner bet for the numbers “4”, “5”, “7” and “8”, a player places a gaming chip 71 on the number “9” to carry out a straight bet for the number “9”, and a player places a gaming chip 71 on the column “2 to 1” to carry out a column bet for the column “2 to 1”. At this time, the betting information detecting device 11 detects one or more betting regions 3 on which each player bets one or more gaming chips 71 and the total value (e.g., three one-dollar, two five-dollar and one ten-dollar) of gaming chips 71 which each player bets on each betting region 3, and transmits the detection result to the PTS server. The PTS server centrally manages the history of detection result.

After all players have bet one or more gaming chips 71, a croupier rotates the roulette board 51 and throws in the roulette ball 61 in the roulette board 51. Then, when the roulette board 51 gently rotates, the roulette ball 61 is received in any one of the thirty-eight pockets 54. For example, if the number of pocket 54 in which the roulette ball 61 is received is “8”, the pocket number detecting device 52 detects that the number of pocket 54 in which the roulette ball 61 is received is “8” and transmits the detection result to the PTS server. The PTS server centrally manages the history of detection result. It is noted that the PTS server may centrally manage the history and various data regarding another roulette board other than the roulette board 51 and another gaming machine such as a slot machine.

An aggregate analysis server (not shown) in the casino hotel is provided with the dividend calculation system. The dividend calculation system calculates the dividend in a current game (roulette), on the basis of the number of pocket 54 in which the roulette ball 61 is received, one or more betting regions 3 on which each player bets one or more gaming chips 71, and the total value of gaming chips 71 which each player bets on each betting region 3.

Next, the betting information detecting device 11 will be described with reference to FIG. 7.

Figure 7:
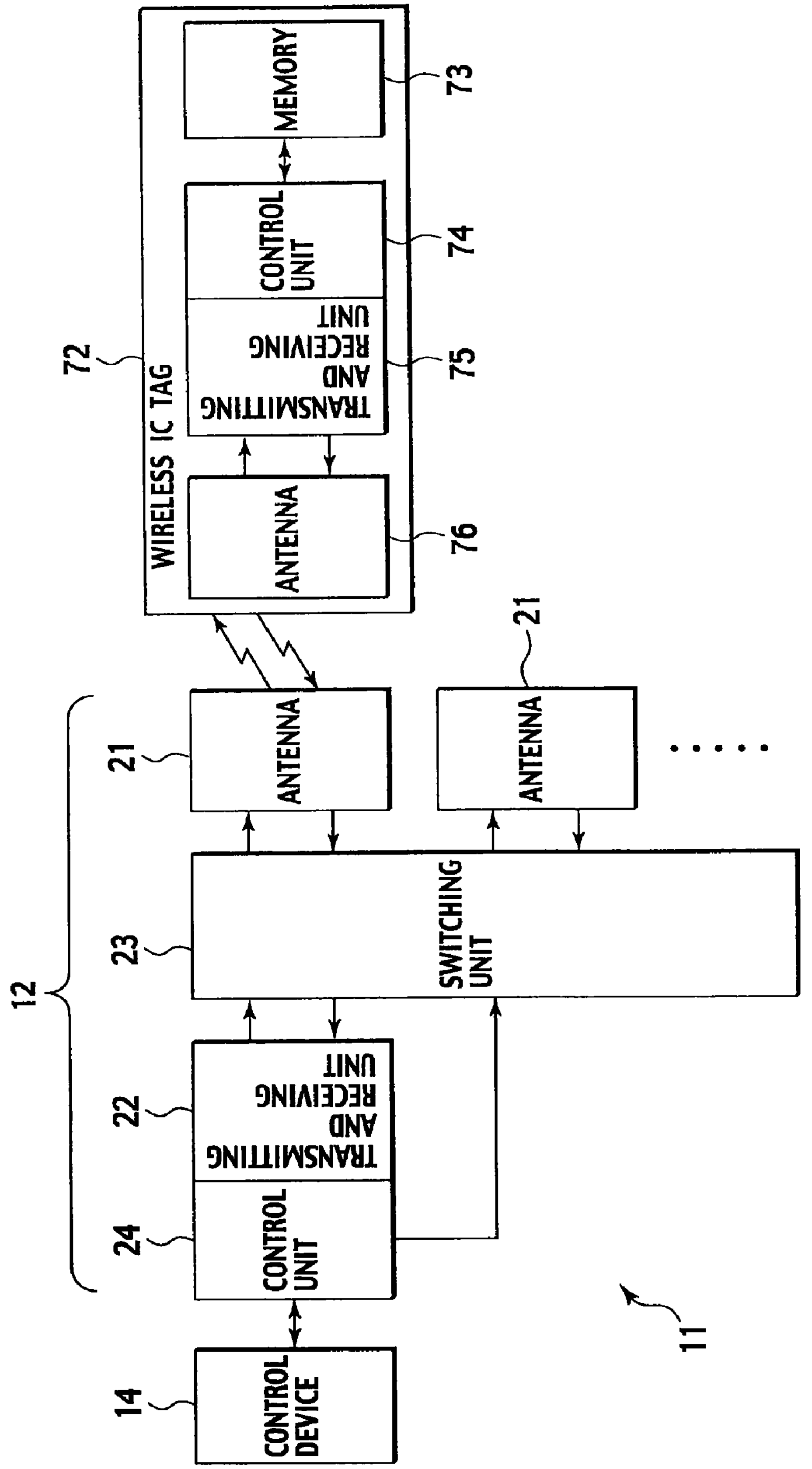
FIG. 7 is a block diagram of electrical connections of a wireless IC tag and a reading device and a control device of the betting apparatus according to the exemplary embodiment of the present invention.

As shown in FIG. 7, the betting information detecting device 11 includes a reading device 12 and a control device 14. The control device 14 instructs the reading device 12 to generate a magnetic field to supply electric power to the wireless IC tag 72 or to transmit information received from the wireless IC tag 72 and stored in the wireless IC tag 72.

The reading device 12 includes antennas (loop antennas) 21, a transmitting and receiving unit 22, a switching unit 23 and a control unit 24. The control unit 24 receives an instruction from the control device 14 and drives the transmitting and receiving unit 22 and the switching unit 23 according to the instruction. The transmitting and receiving unit 22 generates a magnetic field for supply electric power to the wireless IC tag 72 through each antenna 21. More specifically, the transmitting and receiving unit 22 switches the antennas 21 using the switching unit 23 in series, to generate a magnetic field from each antenna 21. At this time, the transmitting and receiving unit 22 receives a radio wave signal using each antenna 21 and the switching unit 23 and demodulates the radio wave signal with load modulation to read information stored in the wireless IC tag 72.

The wireless IC tag 72 is a magnetic field type wireless IC tag and includes a memory 73, a control unit 74, a transmitting and receiving unit 75 and an antenna 76. The memory 73 is a memory device that stores a unique number (identification number) for identifying the gaming chip 71. It is noted that the memory 73 may store value (e.g., one-dollar, five-dollar or ten-dollar) of the gaming chip 71, color of the gaming chip 71, a place where the gaming chip 71 is allowed to be used (information for identifying a casino where the gaming chip 71 is allowed to be used). The control unit 74 interprets a command, a request or an instruction received from the reading device 12 and executes action corresponding to the command, the request or the instruction. The transmitting and receiving unit 75 includes a modulating unit (not shown) and a demodulating unit (not shown), and modulates or demodulates a signal for communicating with the reading device 12. The antenna 76 supplies electric power to the transmitting and receiving unit 75 by a magnetic field from the reading device 12, and receives a modulated wave from the transmitting and receiving unit 75 and emits the modulated wave into air so that the reading device 12 receives it.

Although the betting information detecting device 11 supplies electric power to the wireless IC tag 72 and reads information stored in the wireless IC tag 72, using a common antenna 21, the betting information detecting device 11 may supply electric power to the wireless IC tag 72 using one antenna and read information stored in the wireless IC tag 72 using another antenna.

Figure 8:
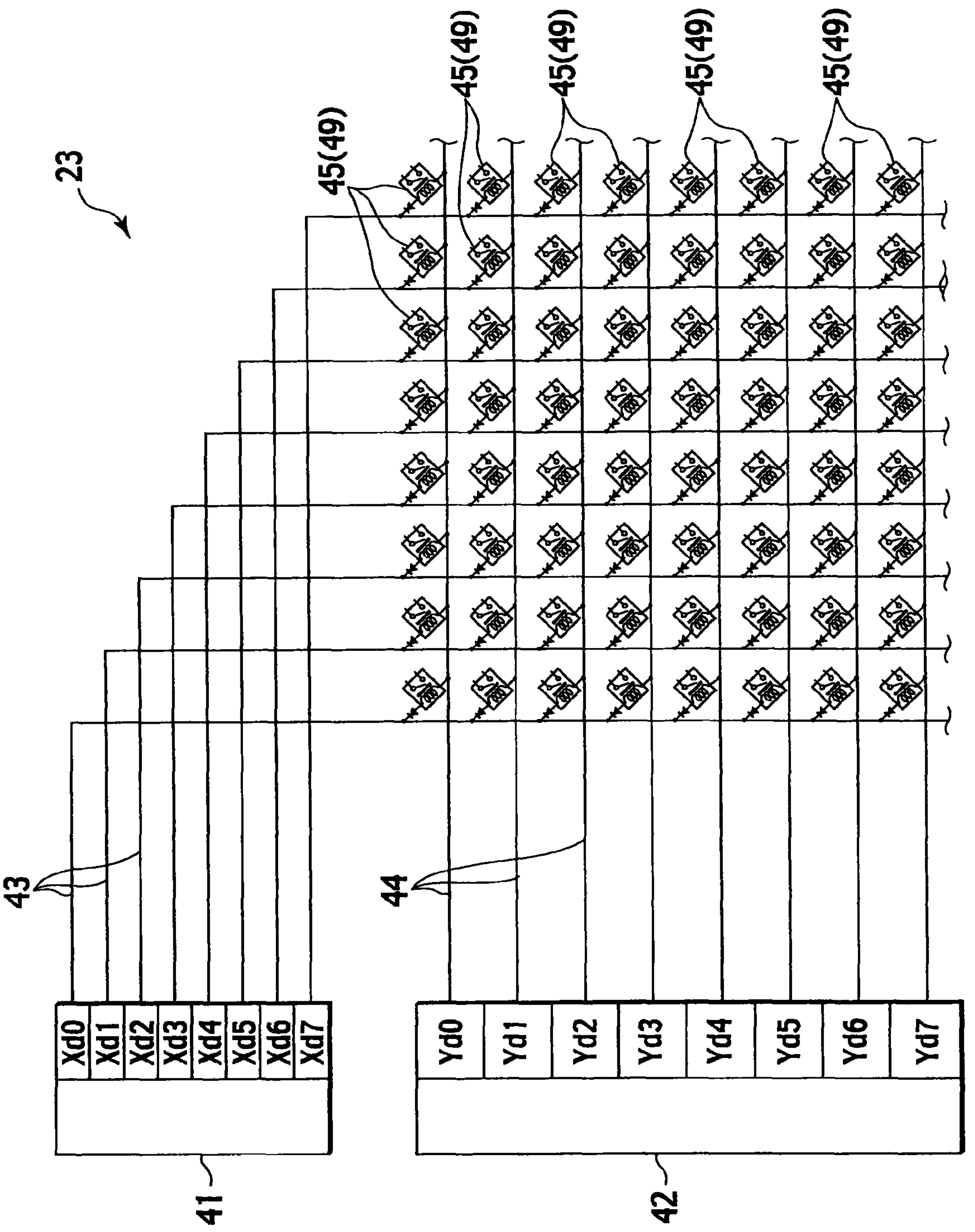
FIG. 8 is a circuit diagram illustrating a configuration of a switching unit of the reading device shown in FIG. 7.
Figure 9:
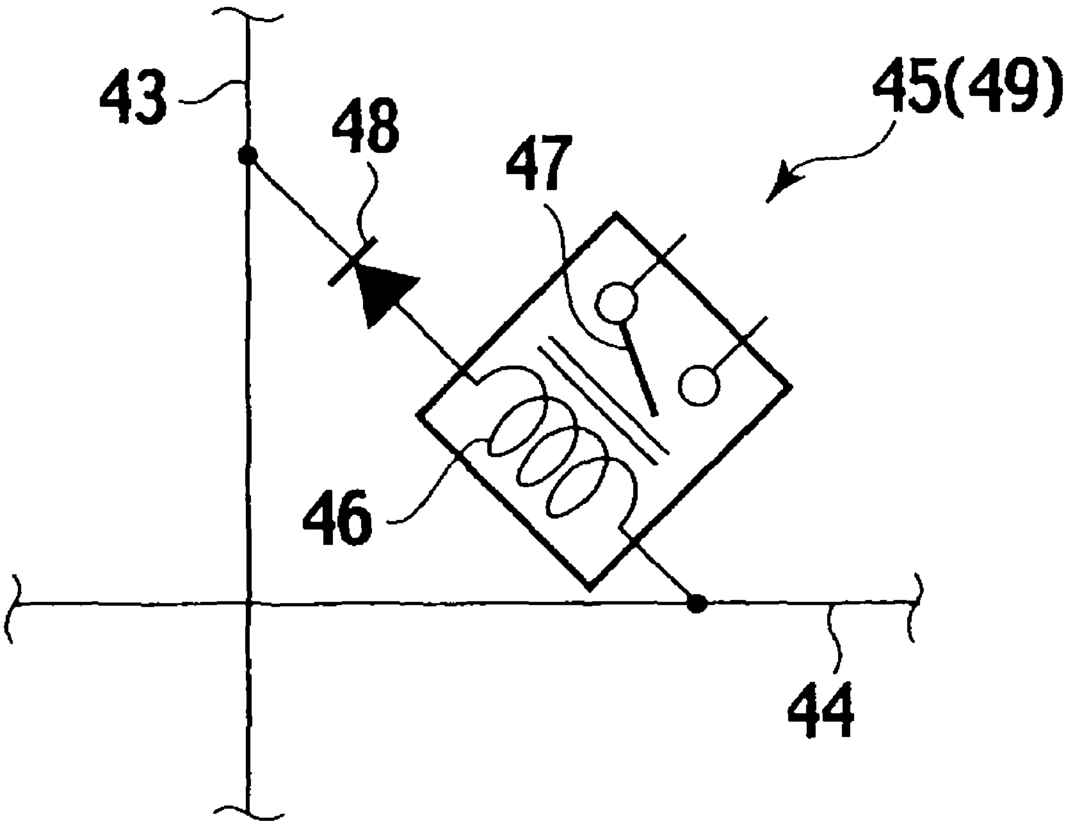
FIG. 9 is a circuit diagram illustrating the configuration of the switching unit of the reading device shown in FIG. 7.

Next, the switching unit 23 will be described with reference to FIGS. 8 to 10.

The switching unit 23 includes an X-side scan driver 41 and a Y-side scan driver 42. Plural X-side transmitting lines 43 extend from the X-side scan driver 41 along a longitudinal direction (or lateral direction) in parallel with one another. Plural Y-side transmitting lines 44 extend from the Y-side scan driver 42 along a lateral direction (or longitudinal direction) in parallel with one another. At each cross point where one X-side transmitting line 43 crosses one Y-side transmitting line 44, relay circuits 45 and 49 are connected. It is noted that FIGS. 8 and 9 illustrate only one relay circuit 45 (or 49). As shown in FIG. 9, each relay circuit 45 (or 49) is connected to the X-side transmitting line 43 at one side of a coil 46 and the Y-side transmitting line 44 at the other side of the coil 46. A diode 48 is connected to the coil 46 and the X-side transmitting line 43 so that a cathode side and an anode side correspond to the X-side transmitting line side and the coil side respectively. In order to tune off the relay circuit 45 (or 49), the X-side transmitting line 43 and the Y-side transmitting line 44 are held at H and L levels respectively. Ordinarily, the X-side transmitting line 43 and the Y-side transmitting line 44 keep this condition. On the other hand, in order to tune on the relay circuit 45 (or 49), the X-side transmitting line 43 and the Y-side transmitting line 44 are switched to L and H levels respectively. This allows current to flow the coil 46 to close a switch 47.

Figure 10:
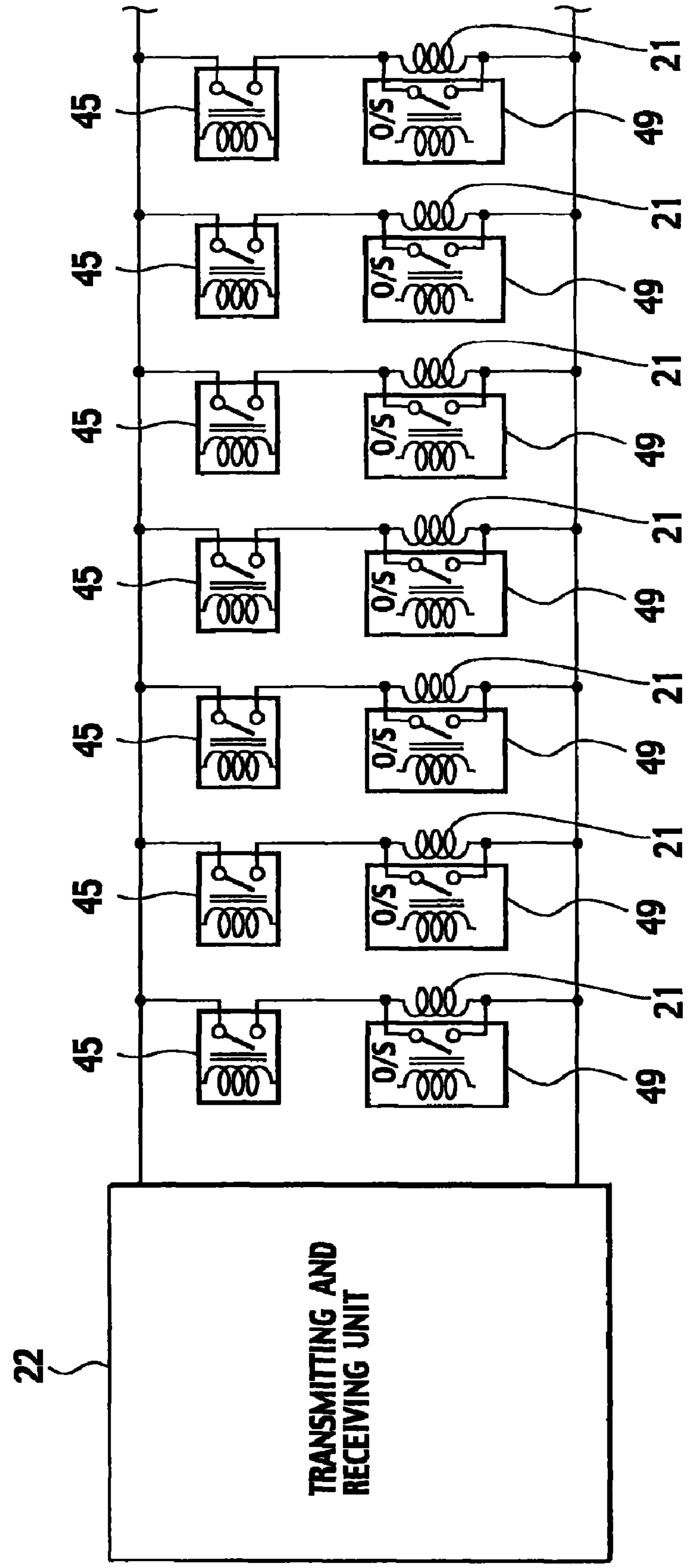
FIG. 10 is a circuit diagram illustrating the configuration of the switching unit of the reading device shown in FIG. 7.

As shown in FIG. 10, one antenna 21 is connected to the relay circuit 45 in series and the relay circuit 49 in parallel. In this connection, when the relay circuit 45 is turned off, the antenna 21 is not driven. When the relay circuit 45 is turned on, the antenna 21 is driven. The relay circuit 45 is a high frequency wave relay. The switch 47 of the relay circuit 49 is connected to the antenna 21 in parallel. When the relay circuit 49 is turned on, the switch 47 is closed to short the antenna 21. When the replay circuit 49 is turned off, the switch 47 is opened to release the short of antenna 21. Thus, the relay circuit 49 controls the open/short of antenna 21 (the current supply of antenna 21) using the switch 47.

Next, the arrangement of the antennas 21 will be described with reference to FIGS. 11 and 12.

Figure 11:
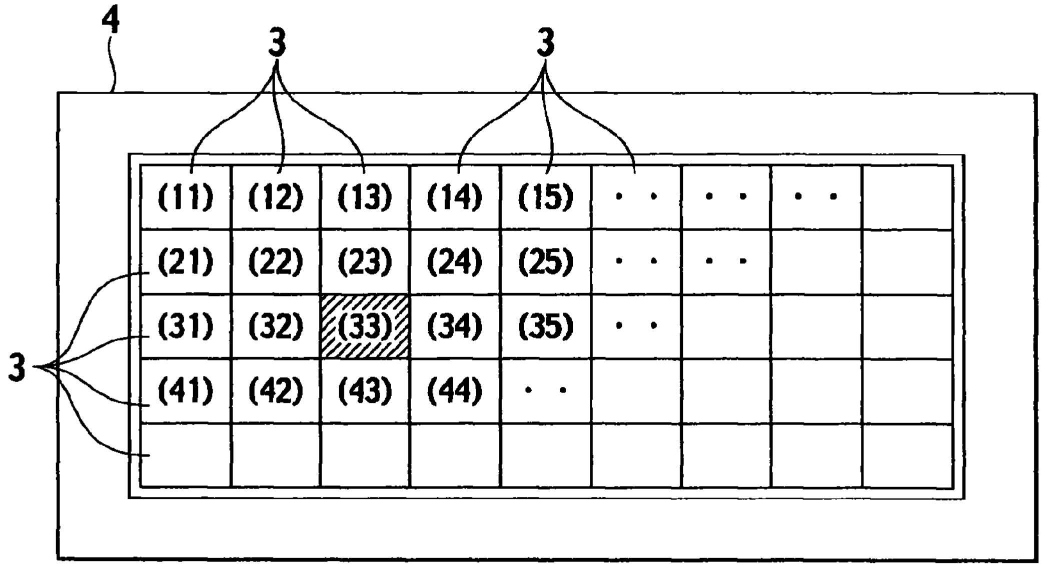
FIG. 11 is an explanatory diagram illustrating one example of an arrangement of antennas in the betting board shown in FIG. 5.

FIG. 11 illustrates one example of the arrangement of antennas 21 in the betting board 4. As shown in FIG. 11, the numbers “11”, “12”, “13”, “14”, “15”, . . . , “21”, “22”, “23”, “24”, “25”, . . . , “31”, “32”, “33”, “34”, “35”, . . . , “41”, “42”, “43”, “44”, . . . are assigned to the betting regions 3. One or more antennas 21 are arranged to each betting region 3. The reading device 12 drives one or more antennas 21 arranged to each betting region 3 in series, in order of increasing the number of the betting region 3 from the number “11”, to sequentially read one or more pieces of information stored in one or more wireless IC tags 72 of one or more gaming chips 71 placed on one or more betting regions 3.

Figure 12:
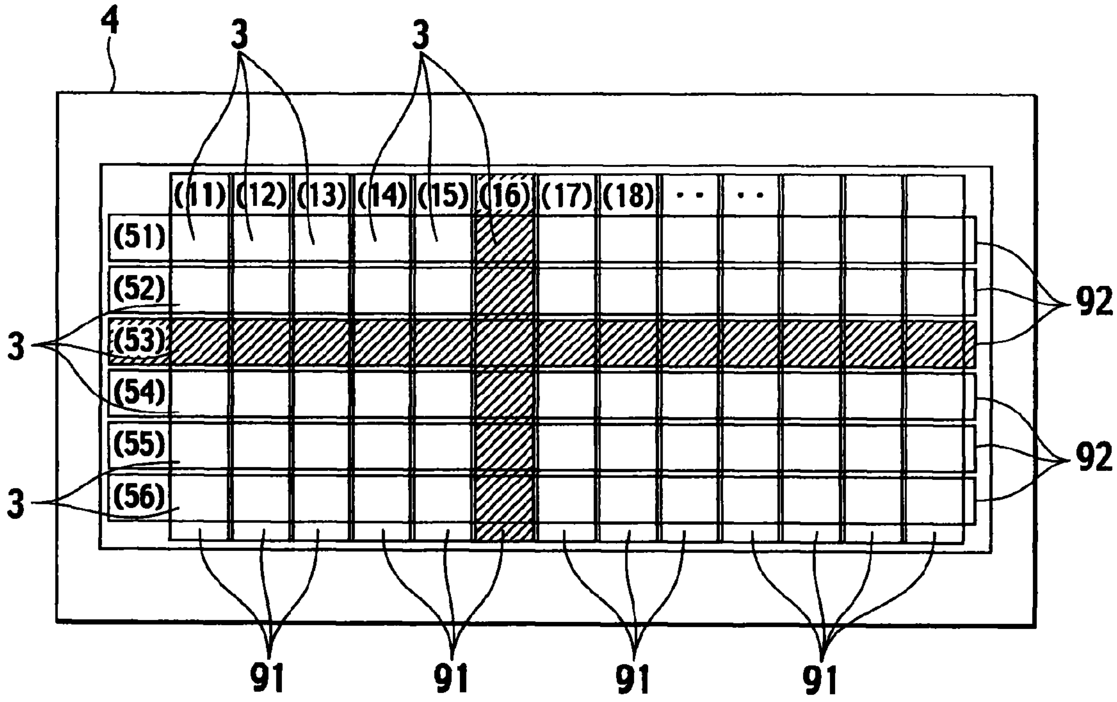
FIG. 12 is an explanatory diagram illustrating another example of an arrangement of antennas in the betting board shown in FIG. 5.

FIG. 12 illustrates another example of the arrangement of antennas 21 in the betting board 4. As shown in FIG. 12, the numbers “11”, “12”, “13”, “14”, “15”, “16”, “17”, “18”, . . . of columns 91 and the numbers “51”, “52”, “53”, “54”, “55”, “56” of rows 92 are assigned to the betting regions 3. Thus, each betting region 3 has the block number composed of the numbers of one column 91 and one row 92. One or more antennas 21 are arranged to each column 91 or each row 92. The reading device 12 drives one or more antennas 21 arranged one column 91 to read one or more pieces of information stored in one or more wireless IC tags 72 of one or more gaming chips 71 placed on the one column 91. Also, the reading device 12 drives one or more antennas 21 arranged one row 92 to read one or more pieces of information stored in one or more wireless IC tags 72 of one or more gaming chips 71 placed on the one row 92.

For example, the reading device 12 firstly drives one or more antennas 21 arranged to each column 91 in series, in order of increasing the number of the column 91 from the number “11”. Next, the reading device 12 drives one or more antennas 21 arranged to each row 92 in series, in order of increasing the number of the row 92 from the number “51”. We assume that gaming chips 71 are placed on betting regions 3 having the column number “11”. In this case, the reading device 12 firstly determines whether or not one or more gaming chips 72 are placed on betting regions 3 having one column number, in order of increasing the number of the column 91 from the number “11”. If one or more gaming chips 72 are placed on betting regions 3 having one column number, the reading device 12 reads one or more pieces of information stored in one or more wireless IC tags 72 of the one or more gaming chips 71. Next, the reading device 12 determines whether or not one or more gaming chips 72 are placed on betting regions 3 having one row number, in order of increasing the number of the row 92 from the number “51”. If one or more gaming chips 72 are placed on betting regions 3 having one row number, the reading device 12 reads one or more pieces of information stored in one or more wireless IC tags 72 of the one or more gaming chips 71. Therefore, the reading device 12 can read one or more pieces of information stored in one or more wireless IC tag 72 of one or more gaming chips placed on each betting region 3 having the column number “11” by carrying out AND operation between the reading result of the column number “11” and that of each row number.

Next, timing for driving the relay circuits 45 and 49 in the switching unit 23 of the reading device 12 according to the instruction from the control device 14 will be described with reference to FIG. 13.

When the reading device 12 drives one antenna 21 arranged to one betting region 3 by turning on the relay circuit 45 corresponding to the one antenna 21, the reading device shorts one or more antennas 21 arranged to one or more betting region 3 adjacent to the one betting region 3 by turning on the relay circuits 49 of the one or more antennas 21. For example, when one antenna 21 to which the number "16" is assigned is turned on (RF ON), two antennas 21 to which the numbers "15" and "17" are assigned, adjacent to the one antenna 21 to which the number "16" is assigned, are shorted (Close). As well, when one antenna 21 to which the number "17" is assigned is turned on (RF ON), two antennas 21 to which the numbers "16" and "18" are assigned, adjacent to the one antenna 21 to which the number "17" is assigned, are shorted (Close). As well, when one antenna 21 to which the number "18" is assigned is turned on (RF ON), two antennas 21 to which the numbers "17" and "19" are assigned, adjacent to the one antenna 21 to which the number "18" is assigned, are shorted (Close).

Figure 14:
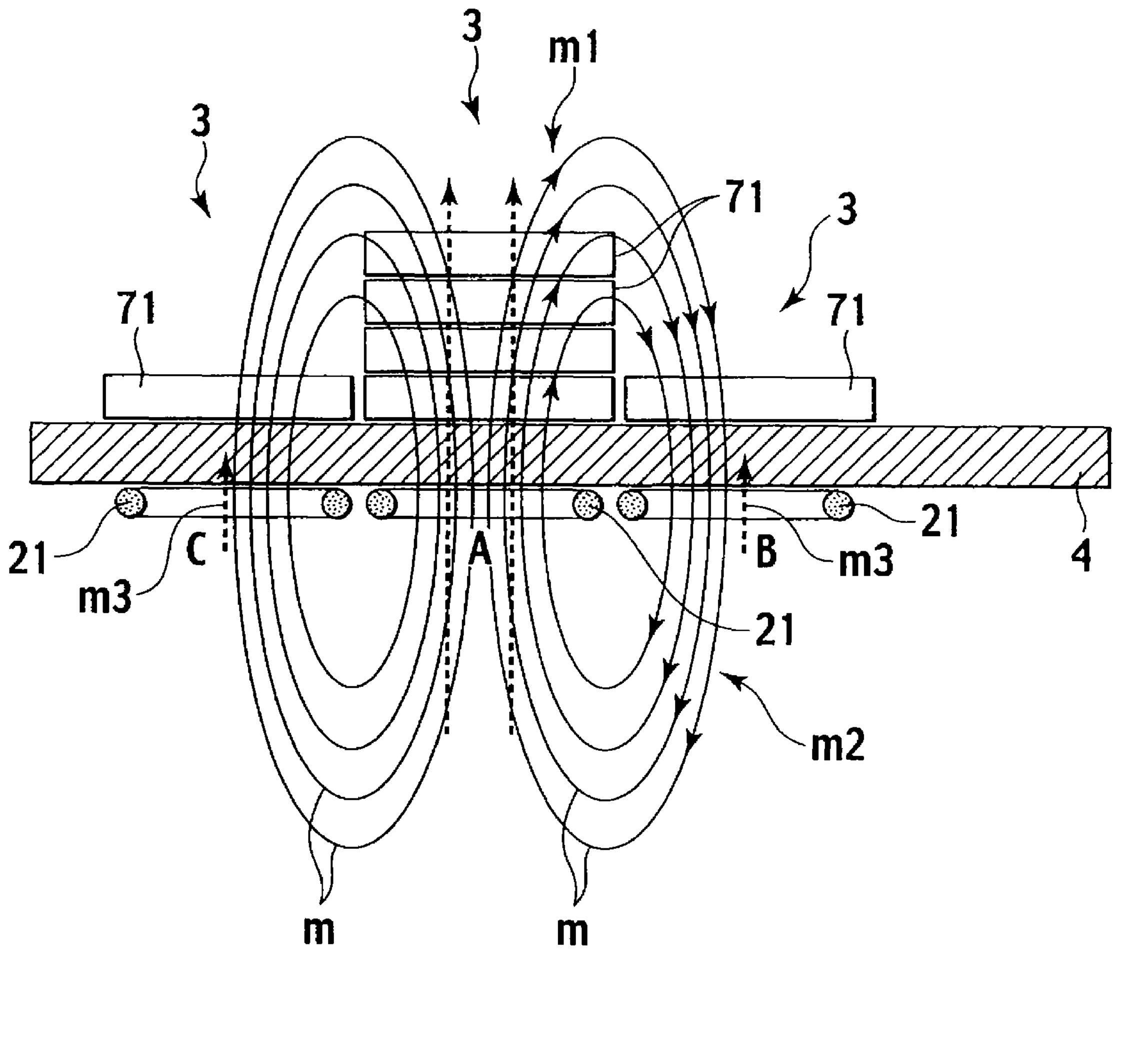
FIG. 14 is an explanatory diagram illustrating magnetic loops generated by one antenna according the exemplary embodiment of the present invention.

FIG. 14 illustrates a magnetic field generated at a time when one antenna 21 is driven by turning on the relay circuit 45 corresponding to the one antenna 21. In FIG. 14, one antenna 21 to which the symbol "A" is assigned, arranged to a center betting region 3, is driven by turning on the relay circuit 45 corresponding to the one antenna 21, and two antennas 45 to which the symbols "B" and "C" are assigned, arranged to left and right betting regions 3, are not driven by keeping turning off the relay circuits 45 corresponding to the two antennas 21.

At this time, magnetic loops "m" are generated by the antenna 21 to which the symbol "A" is assigned. An upward magnetic field formed by upward magnetic lines "m1" supplies electric power to a wireless IC tag 72 of a gaming chip 71 placed on the center betting region 3, which allows the reading device 12 to read information stored in and sent from the wireless IC tag 72. Downward magnetic fields formed by downward magnetic lines "m2" pass through the left and right betting regions 3.

The two antennas 21 to which the symbols "B" and "C" are assigned, arranged to the left and right betting regions 3, are shorted by turning on the relay circuits 49 corresponding to the two antennas 21. This allows the downward magnetic lines "m2" to generate induced currents in closed circuits including the two antennas 21. The induced currents generate induced upward magnetic fields "m3" opposite to the downward magnetic fields "m2". Therefore, the downward magnetic fields "m2" are canceled, which prevents a wireless IC tag 72 of a gaming chip 71 placed on the left or right betting region 3 from being read by one of the downward magnetic fields "m2".

In the example of FIG. 11, when driving one or more antennas 21 arranged to the betting region 3 to which the number "33" is assigned, the reading device 12 shorts antennas 21 arranged to the betting regions 3 to which the numbers "23", "32", "34" and "43" are assigned.

In the example of FIG. 12, when driving one or more antennas 21 arranged to the betting regions 3 to which the number "16" of column 91 is assigned, the reading device 12 shorts antennas 21 arranged to the betting regions 3 to which the numbers "15" and "17" of column 91 are assigned. Also, when driving one or more antennas 21 arranged to the betting regions 3 to which the number "53" of row 92 is assigned, the reading device 12 shorts antennas 21 arranged to the betting regions 3 to which the numbers "52" and "54" of row 92 are assigned.

In this case, if the magnitude of magnetic field generated at the time when one antenna 21 is driven is large and the magnetic field affects betting regions 3 outside betting regions 3 adjacent to one betting region 3 to which the one antenna 21 is arranged, the reading device 12 should short antennas 21 arranged to the betting regions 3 outside the adjacent betting regions 3.

Figure 13:
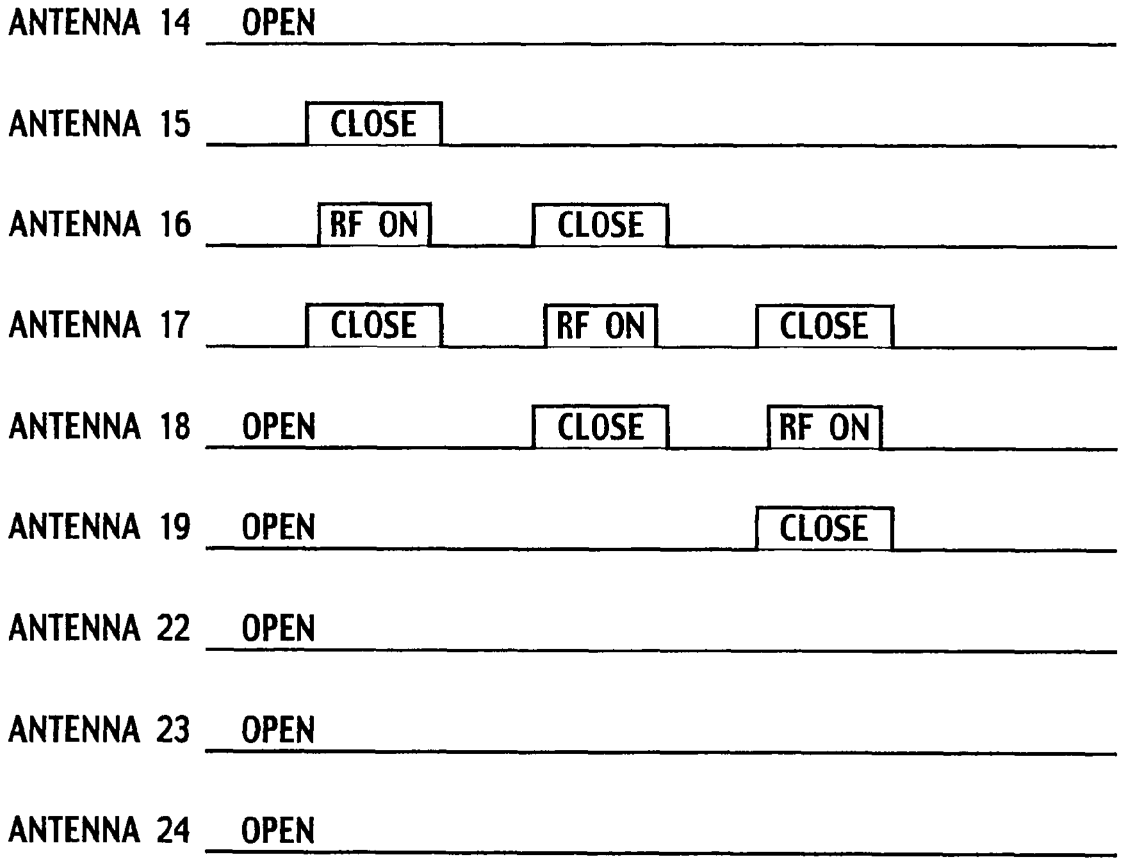
FIG. 13 is a timing chart illustrating the timing for driving each relay circuit in the switching unit of the reading device shown in FIG. 7.

As shown in FIG. 13, the reading device 12 starts driving one antenna 21 arranged to one betting region 3 by turning on the relay circuit 45 corresponding to the one antenna 21, slightly behind the time when shorting antennas 21 arranged to betting regions 3 adjacent to the one betting region 3. Further, the reading device 12 finishes driving one antenna 21 arranged to one betting region 3 by turning off the relay circuit 45 corresponding to the one antenna 21, slightly before the time when releasing the shorts of antennas 21 arranged to betting regions 3 adjacent to the one betting region 3.

Namely, if the reading device 12 simultaneously starts driving one antenna 21 arranged to one betting region 3 by turning on the relay circuit 45 corresponding to the one antenna 21 and shorts antennas 21 arranged to betting regions 3 adjacent to the one betting region 3, it is possible for one timing to be slightly off another timing in the real world. As well, if the reading device 12 simultaneously finishes driving one antenna 21 arranged to one betting region 3 by turning off the relay circuit 45 corresponding to the one antenna 21 and releases the shorts of antennas 21 arranged to betting regions 3 adjacent to the one betting region 3, it is possible for one timing to be slightly off another timing in the real world. This causes one antenna 21 arranged to one betting region 3 to be driven without shorting antennas 21 arranged to betting regions 3 adjacent to the one betting region 3, which allows the reading device 12 to read one or more pieces of information stored in one or more wireless IC tag 72 of one or more gaming chips 71 placed on the adjacent betting regions 3.

Therefore, both timings are previously set so that one timing is slightly off another timing as shown in FIG. 13, which surely prevents the reading device 12 from reading one or more pieces of information stored in one or more wireless IC tag 72 of one or more gaming chips 71 placed on the adjacent betting region 3.

As a modified embodiment, one or more reading devices 12 may simultaneously drive each antenna 21 arranged to one betting region 3 and each antenna 21 arranged to each of another one or more betting regions 3, wherein at least two betting regions 3 are located between the one betting region 3 and each of the another one or more betting regions 3.

Figure 15:
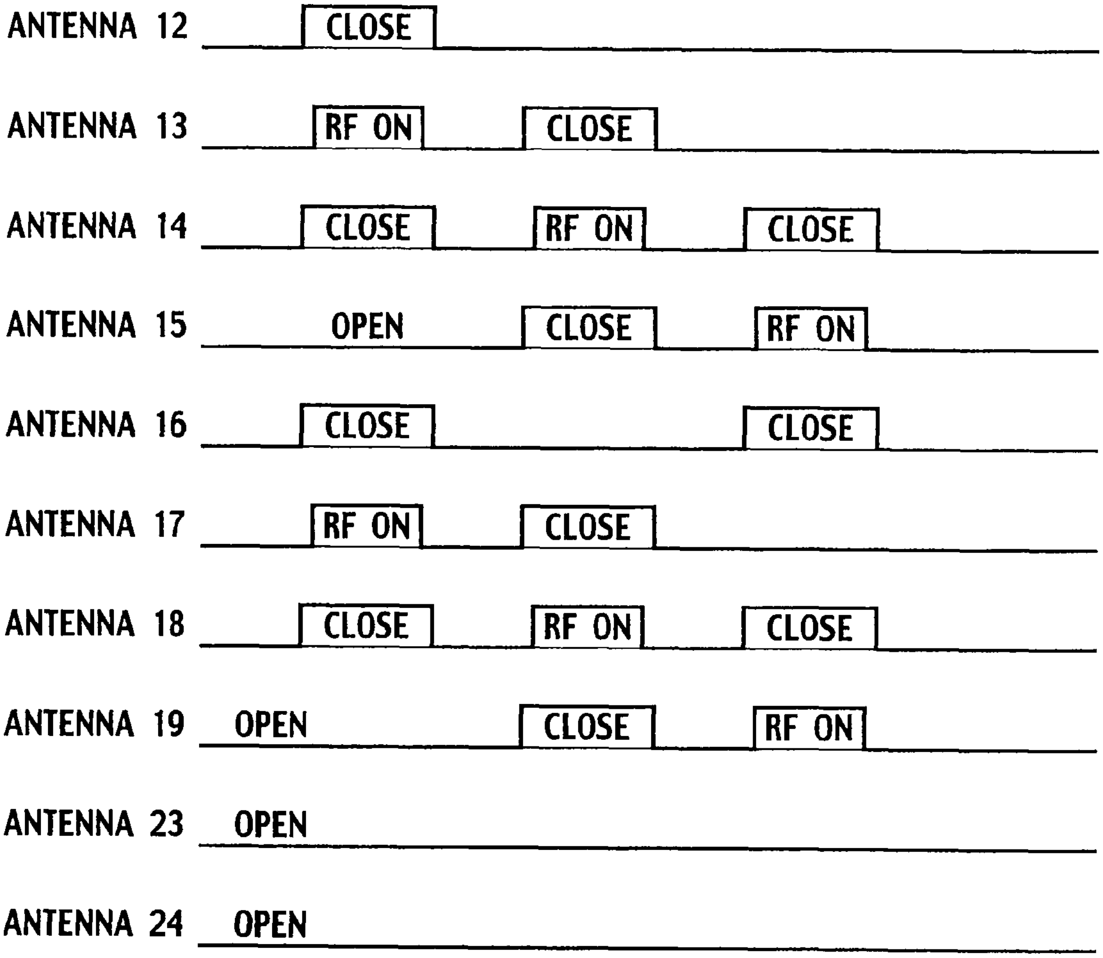
FIG. 15 is a modified timing chart illustrating the timing for driving each relay circuit in the switching unit of the reading device shown in FIG. 7.

For example, as shown in FIG. 15, when one antenna 21 to which the number "13" is assigned is turned on (RF ON), two antennas 21 to which the numbers "12" and "14" are assigned, adjacent to the one antenna 21 to which the number "13" is assigned, are shorted (Close). At the same time, when one antenna 21 to which the number "17" is assigned is turned on (RF ON), two antennas 21 to which the numbers "16" and "18" are assigned, adjacent to the one antenna 21 to which the number "17" is assigned, are shorted (Close). In this example, one antenna 21 is arranged to one betting region 3, and three betting regions 3 are located between the betting region 3 to which the one antenna 21 of the number "13" is arranged and the betting region 3 to which the one antenna 21 of the number "17" is arranged. As well, when one antenna 21 to which the number "14" is assigned is turned on (RF ON), two antennas 21 to which the numbers "13" and "15" are assigned, adjacent to the one antenna 21 to which the number "14" is assigned, are shorted (Close). At the same time, when one antenna 21 to which the number "18" is assigned is turned on (RF ON), two antennas 21 to which the numbers "17" and "19" are assigned, adjacent to the one antenna 21 to which the number "18" is assigned, are shorted (Close).

The amount of time for reading plural pieces of information of all gaming chips 71 on the whole betting board 4 according to the modified embodiment is less than that for reading plural pieces of information of all gaming chips 71 on the whole betting board 4 according to the embodiment. This allows the reading time to be reduced.

Since at least two betting regions 3 are located between one betting region 3 to which an antenna 21 driven is arranged and each of another one or more betting regions 3 to which one or more antennas 21 simultaneously driven are arranged, downward magnetic fields formed by downward magnetic lines "m2" and passing through betting regions 3 adjacent to the one betting region 3 are surely canceled by induced magnetic fields, which prevents interference from occurring.

Although the betting board 4 used in roulette is cited as the exemplary embodiment of the present invention, the present invention may be applied to a betting board used in a card game such as blackjack or poker or other games to be played in a casino.

What is claimed is:

1. A betting apparatus for a game comprising:

a betting board;

antennas that are arranged to regions on the being board and that detect a gaming chip placed on the betting board; and a control unit that turns on or off electric current to each of the antennas, wherein, when the control unit turns on electric current to one antenna arranged to one region, the control unit shorts another antenna arranged to another region adjacent to the one region, and when a magnetic field generated by the one antenna affects the another antenna, an induced magnetic field is generated in the shorted another antenna to cancel the magnetic field.

2. The betting apparatus for a game according to claim 1, wherein, when the control unit turns on the electric current to the one antenna arranged to the one region, the control unit shorts the another antenna arranged to the another region adjacent to the one region before starting turning on the electric current, when the magnetic filed generated by turning on the electric current to the one antenna affects the another antenna, an induced current is generated in the shorted another antenna to generate the induced magnetic field, and when the control unit turns off the electric current to the one antenna arranged to the one region, the control unit releases the short of the another antenna arranged to the another region adjacent to the one region after stopping turning off the electric current.

3. The betting apparatus for a game according to claim 1, wherein the control unit simultaneously turns on electric current to at least two antennas arranged to at least two regions between which at least two regions are located.

4. The betting apparatus for a game according to claim 1, further comprising:

a switching unit that shorts each of the antennas and releases the short of each of the antennas, wherein, when the control unit turns on the electric current to the one antenna arranged to the one region, the control unit shorts the another antenna arranged to the another region adjacent to the one region using the switching unit.

* * * * *